US008572682B2

(12) United States Patent
Karabulut

(10) Patent No.: US 8,572,682 B2
(45) Date of Patent: Oct. 29, 2013

(54) SYSTEM AND METHOD OF ACCESSING DATA OBJECTS IN A DYNAMIC LANGUAGE ENVIRONMENT

(75) Inventor: Yuecel Karabulut, Mountain View, CA (US)

(73) Assignee: SAP AG, Walldorf (DE)

( * ) Notice: Subject to any disclaimer, the term of this patent is extended or adjusted under 35 U.S.C. 154(b) by 852 days.

(21) Appl. No.: 12/643,600

(22) Filed: Dec. 21, 2009

(65) Prior Publication Data

US 2011/0154433 A1 Jun. 23, 2011

(51) Int. Cl.
*G06F 21/00* (2013.01)

(52) U.S. Cl.
USPC .............. 726/2; 726/1; 726/3; 726/4; 726/29; 719/328; 719/329; 719/330; 719/331; 719/332; 717/120; 717/151; 717/152; 717/153; 717/154; 707/694

(58) Field of Classification Search
USPC ............. 726/1–4, 29; 719/328–332; 717/120, 717/152–154; 707/694
See application file for complete search history.

(56) References Cited

U.S. PATENT DOCUMENTS

2008/0301760 A1* 12/2008 Lim .................................. 726/1

OTHER PUBLICATIONS

U.S. Appl. No. 11/935,285, Brendle, Rainer et al.
U.S. Appl. No. 12/167,915, Karabulut, Yuecel et al.
ABAP Programming, SAP Library, http://help.sap.com/saphelp__nw04/helpdata/en/e4/2adbd7449911d1949c0000e8353423/frameset.htm 2004.
NIST Special Publication 800-30 "Risk Management Guide for Information Technology Systems," Jul. 2002.
NIST Special Publication 800-64 "Security Considerations in the System Development Life Cycle," Oct. 2008.
F. Chong, G. Carraro, and R. Wolter, "Multi-Tenant Data Architecture," Microsoft Corporation, Jun. 2006.
C. Kothari, "Meeting Security Requirements of Software as a Service (SaaS) Application," IBM, Sep. 25, 2007.
S. Bobrowski, "A Practical Demonstration of SaaS Using Oracle Application Express," Oracle Technology Network, Aug. 2007.
G. Carraro and F. Chong, "Software as a Service (SaaS): An enterprise Perspective," Microsoft Corporation, Oct. 2006.
Trusted Systems: Trust Relationships Between SAP Systems, 2004. http://help.sap.com/saphelp__nw04/helpdata/en/22/042671488911d189490000e829fbbd/frameselt.htm.
XACML, eXtensible Access Control Markup Language, Apr. 2008. http://www.oasis-open.org/committees/tc__home.php?wg__abbrev=xacml.
M. Fowler, "Language Workbenches: The Killer-App for Domain Specific Languages?," Fowler.com Jun. 12, 2005. http://martinfowler.com/articles/languageWorkbench.html.
P. Manadhata, Y. Karabulut, and J. Wing, "Measuring the Attack Surfaces of SAP Software Systems." 19th International symposium on Software Reliability Engineering (ISSRE'08), Nov. 2008, Seattle, WA, USA.

* cited by examiner

*Primary Examiner* — Brandon Hoffman
*Assistant Examiner* — Hee Song
(74) *Attorney, Agent, or Firm* — Fountainhead Law Group, PC

(57) ABSTRACT

An embodiment includes a computer-implemented method of managing access control policies on a computer system having two high-level programming language environments. The method includes managing, by the computer system, a structured language environment. The method further includes managing, by the computer system, a dynamic language environment within the structured language environment. The method further includes receiving a policy. The policy is written in a dynamic language. The method further includes storing the policy in the dynamic language environment. The method further includes converting the policy from the dynamic language environment to the structured language environment. The method further includes generating a runtime in the structured language environment that includes the policy.

20 Claims, 12 Drawing Sheets

```
policy_set do
  policy <policy name> do
    grant | deny do
      <subject condition>

            <operation condition>

            <resource condition>

            <instance-based access control condition>
    end
  end
end
```

FIG. 9A

```
policy_set do
  policy :BOACPolicy do
    grant do
      condition do
        source :ROLES, :SUBJ
        evalfunc :CONTAINS
        target :ZTST_CUSTOMER_ROLE, :VALU
      end
      condition do
        source :ASSIGNED_DOMAINS, :SUBJ do
          filter :ZTST_CUSTOMER_ROLE
          filter :BLUERUBY_WORKCENTER
          filter :RBAMTEST_Sales_Organisation
        end
        evalfunc :IS_EMPTY_OR_HAS_INTERSECT_WITH
        target :PERSISTENT_DOMAINS, :RESO do
          filter :RBAMTEST_Sales_Organisation
          filter :GRANT
        end
      end
      condition do
        source :ID, :RESO
        evalfunc :IS_CHILD_OF
        target :RBAMTEST_Customer, :VALU
      end
    end
  end
end
```

FIG. 9B

```
role_assignments do

  assign <role name>, <user name> do
    <user-role assignment restrictions>
  end

end
```

FIG. 11A

```
role_assignments do

  assign :ZTST_CUSTOMER_ROLE, :KARABULUTY do
    workcenter :BLUERUBY_WORKCENTER
    access_context :RBAMTEST_Sales_Organisation
    access_group :SAP
    subordinated
  end

  assign :ZTST_CUSTOMER_ROLE, :TESTGREENE do
    workcenter :BLUERUBY_WORKCENTER
    access_context :RBAMTEST_Sales_Organisation
    access_group :SAP_DE
  end

  assign :ZTST_CUSTOMER_ROLE, :TESTDOUGLAS do
    workcenter :BLUERUBY_WORKCENTER
    access_context :RBAMTEST_Sales_Organisation
    access_group :SAP_US
  end

end
```

FIG. 11B

SYSTEM AND METHOD OF ACCESSING DATA OBJECTS IN A DYNAMIC LANGUAGE ENVIRONMENT

CROSS REFERENCE TO RELATED APPLICATIONS

Not applicable.

BACKGROUND

The description generally relates to computer systems, and more particularly relates to systems in that access control to data structures (e.g., business objects) is implemented in a multi-language environment.

Unless otherwise indicated herein, the approaches described in this section are not prior art to the claims in this application and are not admitted to be prior art by inclusion in this section.

Modern computer systems have components that use different programming languages. This is more and more applicable for systems with business applications.

Peripheral components need customization or modifications to be introduced by customers. There is a tendency to use languages that are easy to use by the customers. Often such languages are dynamic languages in the sense of their ability to change code and logical structures at run-time. An example of such a dynamic language is Ruby.

On the other hand, core components are maintained by the manufacturers of the system and the languages are selected to optimize security, performance, access control to business objects etc. These languages are non-dynamic in that changing code and logical structures at run-time is not favored when optimizing security, performance and access control.

SUMMARY

Embodiments improve the interactions between dynamic languages and non-dynamic languages in a computer system. An embodiment includes a computer-implemented method of managing access control policies on a computer system having two high-level programming language environments. The method includes managing, by the computer system, a structured language environment. The method further includes managing, by the computer system, a dynamic language environment within the structured language environment. The method further includes receiving a policy. The policy is written in a dynamic language. The method further includes storing the policy in the dynamic language environment. The method further includes converting the policy from the dynamic language environment to the structured language environment. The method further includes generating a runtime in the structured language environment that includes the policy.

A computer system may be configured to operate according to the method described above. A computer program may be embodied on a tangible recording medium, that is configured to control a computer system to operate according to the method described above.

The method may further include permitting access, according to the policy in the runtime having been generated, to a data object managed by the structured language environment, by a user operating in the dynamic language environment.

The method may further include receiving user-role assignment information. The user-role assignment information is written in the dynamic language. The method may further include converting the user-role assignment information from the dynamic language environment to the structured language environment. The method may further include storing the user-role assignment information as a data object in the in the structured language environment.

The following detailed description and accompanying drawings provide a better understanding of the nature and advantages of one or more embodiments.

BRIEF DESCRIPTION OF THE DRAWINGS

FIG. 9A shows a simplified view of a RBAM Policy DSL according to an embodiment.

FIG. 9B shows an example RBAM Policy specified in the DSL structure shown in FIG. 9A, according to an embodiment.

FIG. 11A shows a simplified view of the User-Role Assignment DSL, according to an embodiment.

FIG. 11B shows an example of a user-role assignment and user-role assignment restriction in the DSL of FIG. 11A, according to an embodiment.

DETAILED DESCRIPTION

Figure 1:
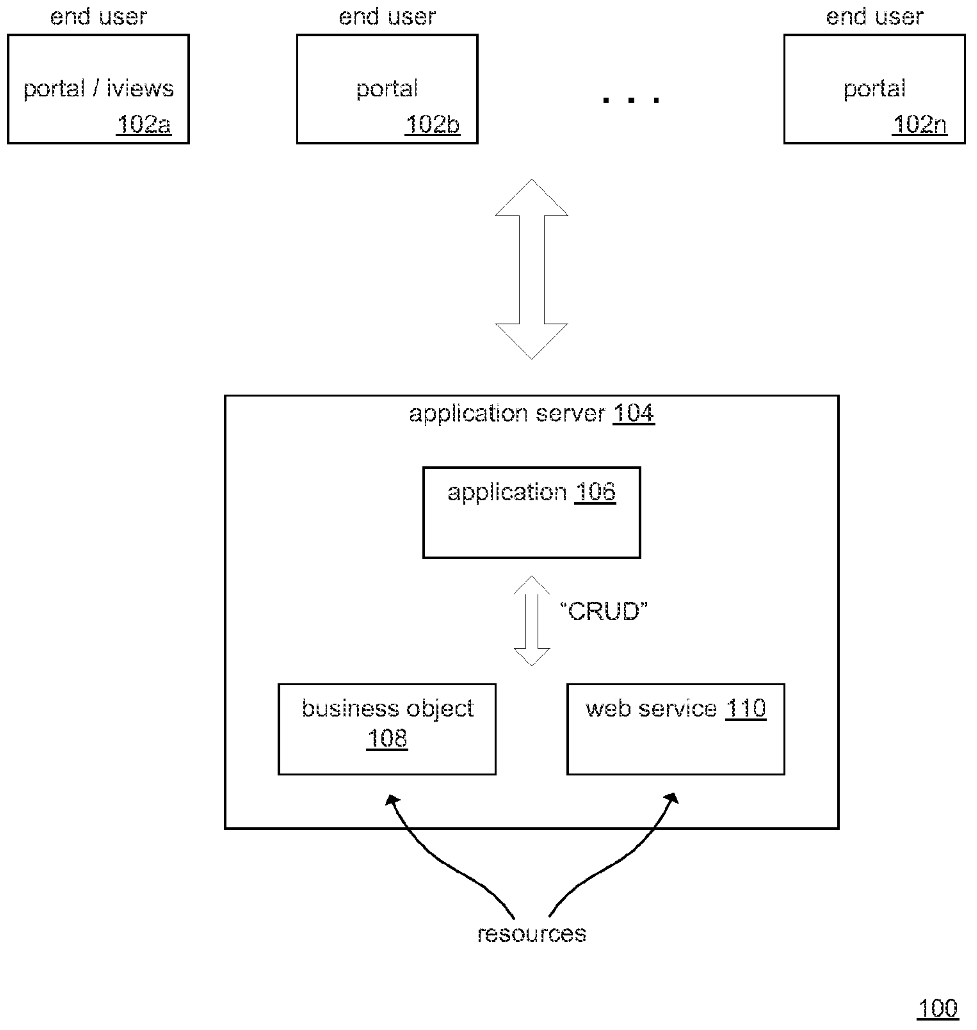
FIG. 1 is a block diagram of a computer system with one or more portals and an application server, according to an embodiment.

Described herein are techniques for accessing data objects in a dynamic language environment. In the following description, for purposes of explanation, numerous examples and specific details are set forth in order to provide a thorough understanding of one or more embodiments. It will be evident, however, to one skilled in the art that the embodiments as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In the following description, the terms "and", "or" and "and/or" are used. Such terms are to be read as having the same meaning; that is, inclusively. For example, "A and B" may mean "both A and B", "only A" and "only B". As another example, "A or B" may mean "only A", "only B" and "both A and B". When an exclusive or is intended, such will be specifically noted (e.g., "either A or B").

Programming languages may be broadly categorized into two types: dynamic programming languages and non-dynamic programming languages. A non-dynamic language may be thought of as a programming language where the binding between method (or procedure) calls to the implementing methods happens at compile time. A dynamic language may be thought of as a programming language where the binding happens at runtime and usually can be overwritten in the program at any time. In non-dynamic languages, the method calls may be calls to procedures, which are assigned to classes. In dynamic languages, a method call may be a message to be sent to an instance of a class, and it is the task of the class to decide what to do with the message.

More specifically, the term "dynamic programming language" (also referred to as "dynamic language", "dynamic scripting language", "dynamic language environment", "dynamic scripting language environment", etc.) describes a class of high level programming languages (or programming environments that implement the programming languages) that execute at runtime many common behaviors that other languages might perform during compilation, if at all. These behaviors could include extension of the program, by adding new code, by extending objects and definitions, or by modifying the type system, all during program execution. These behaviors can be emulated in nearly any language of sufficient complexity, but dynamic languages provide direct tools to make use of them. The term "non-dynamic programming language" describes languages that lack these behaviors. (Non-dynamic programming languages may also be referred to as "static programming languages"; the terms "structured programming language", "structured language environment", etc. may also be used.)

Dynamic programming languages have a number of benefits, either actual or perceived. They are flexible, for example, by allowing dynamic typing of variables, and giving the ability to change code and logical structures at runtime. Many dynamic languages are open source languages. Dynamic languages allow for high productivity, for example, being easy to learn and having a straightforward syntax. Dynamic languages often allow for easier integration, for example in environments such as mashups or other web services.

An example of a dynamic language is Ruby. Ruby is a reflective, dynamic, object-oriented programming language. It combines syntax inspired by Perl with Smalltalk-like object-oriented features, and also shares some features with Python, Lisp, Dylan, and CLU. Ruby is a single-pass interpreted language.

An example of a structured language is ABAP™. ABAP™ is an application-specific fourth-generation language (4GL) first developed in the 1980s. It was originally the report language for SAP R/2, a platform that enabled large corporations to build mainframe business applications for materials management and financial and management accounting. ABAP stands for Advanced Business Application Programming. ABAP was one of the first languages to include the concept of Logical Databases (LDBs), which provides a high level of abstraction from the basic database level.

In the following description, the term "high-level programming language" is used. A high-level programming language may be contrasted with a low-level programming language (although note that the terms high-level and low-level are inherently relative). In general, a low-level programming language deals with registers, memory addresses and call stacks. A low-level language has opcodes that can directly compile the language into machine code. In general, a high-level programming language refers to a higher level of abstraction from machine language. High-level languages deal with threads, locks, objects, variables, arrays and complex arithmetic or boolean expressions; these features improve the usability of the language from a user perspective. Other features such as string handling routines, object-oriented language features and file input/output may also be present. In the context of an embodiment, high level languages are intended for use by application developers to develop applications for use by users of the applications on the computer system; thus the other languages that support the application, such as the machine code, the assembly code, the file system, the operating system, etc. are not to be considered high-level languages in the context of an embodiment.

An embodiment is directed toward assisting a security administrator to use a dynamic programming language environment to specify the access control policies for data structures (e.g., business objects) so that these policies can be used to regulate access to the data structures from the applications written in a dynamic scripting language. According to a first aspect, a Domain Specific Language (DSL) based in the dynamic language environment provides for the specification of access control policies. A security admin specifies a policy which is then transformed to the policies of the structured language environment on the backend side. The enforcement takes place on the structured language environment side. A second aspect of an embodiment provides enforcement functionality on the dynamic language environment side.

In an exemplary implementation, the Application Platform (AP), as part of SAP's Business Process Platform, has been designed around SAP's Enterprise Service-Oriented Architecture (eSOA). Most application logic and all application data within AP is encapsulated in data structures (also referred to as "Business Objects"), which in turn are accessible via Service Interfaces. AP offers multiple ABAP™ (Advanced Business Application Programming) and Java™ based options to access Business Objects. To overcome the missing Business Object access from environments other than ABAP™ or Java™, the Business Query Language (BQL) has been developed as an approach to access the CRUD (create, read, update and delete) operations of Business Objects in an SQL-like (structured query language) syntax. SAP's Blue Ruby project uses BQL as a simple access mechanism to AP Business Objects. The Blue Ruby BQL Bridge to the Application Platform allows reading and updating the data contained in the Business Objects (BOs) offered by AP. A Ruby developer simply writes a BQL statement (e.g. a SELECT or UPDATE statement), and executes it against AP. AP's current authorization mechanism, provided by NW RBAM (Netweaver Role Based Access Management), has been explicitly designed to provide an authorization solution for SAP's ByDesign Portal. The authorization concept provides Business Object and instance based access control when accessing Business Objects from the ByDesign Portal. The policy specification and user-role management components of RBAM are implemented in Java and Portal based solutions. In the absence of the features of an embodiment, RBAM's Java based functionality cannot be used for Blue Ruby, as its applications are coded in Ruby and run on the Blue Ruby VM. To allow RBAM's Java based functionality to be used for Blue Ruby, an embodiment uses a Ruby based DSL for the specification of access control policies. A security admin specifies a policy which is then transformed to AP's RBAM policies on the backend side. The enforcement takes place on the RBAM side. A second aspect of an embodiment provides enforcement functionality on the Ruby side.

Further details and exemplary embodiments are provided in subsequent paragraphs.

FIG. 1 is a block diagram of a computer system 100 with one or more portals (102*a*, 102*b*, . . . 102*n*) and an application server 104, according to an embodiment. An exemplary embodiment is in an on-demand environment (such as the ByDesign environment by SAP), such as with a hardware computer server that implements the application server 104 and a hardware client computer that implements the portal 102*a*, connected via a computer network such as the internet. To keep the explanation a simple as possible, singular terms instead of plural terms are used (e.g., "portal", not "portals"); the reader is encouraged to extend the description to plural terms as desired.

At the portal side, a human user operates a portal 102*a* with iViews (that are collectively called a work center). At the server side, a server 104 executes an application 106 that let the user access a business object (BO) 108 and/or a web service (WS) 110 (collectively "resource"). Access to a resource includes the ability to create, read, update and delete (CRUD) data, write data, modify data, etc. Looking at business terms: The portal 102*a* is usually operated by an SAP customer (customer user) and the server 104 is intended to be maintained by SAP (or other enterprise resource provider).

Figure 2:
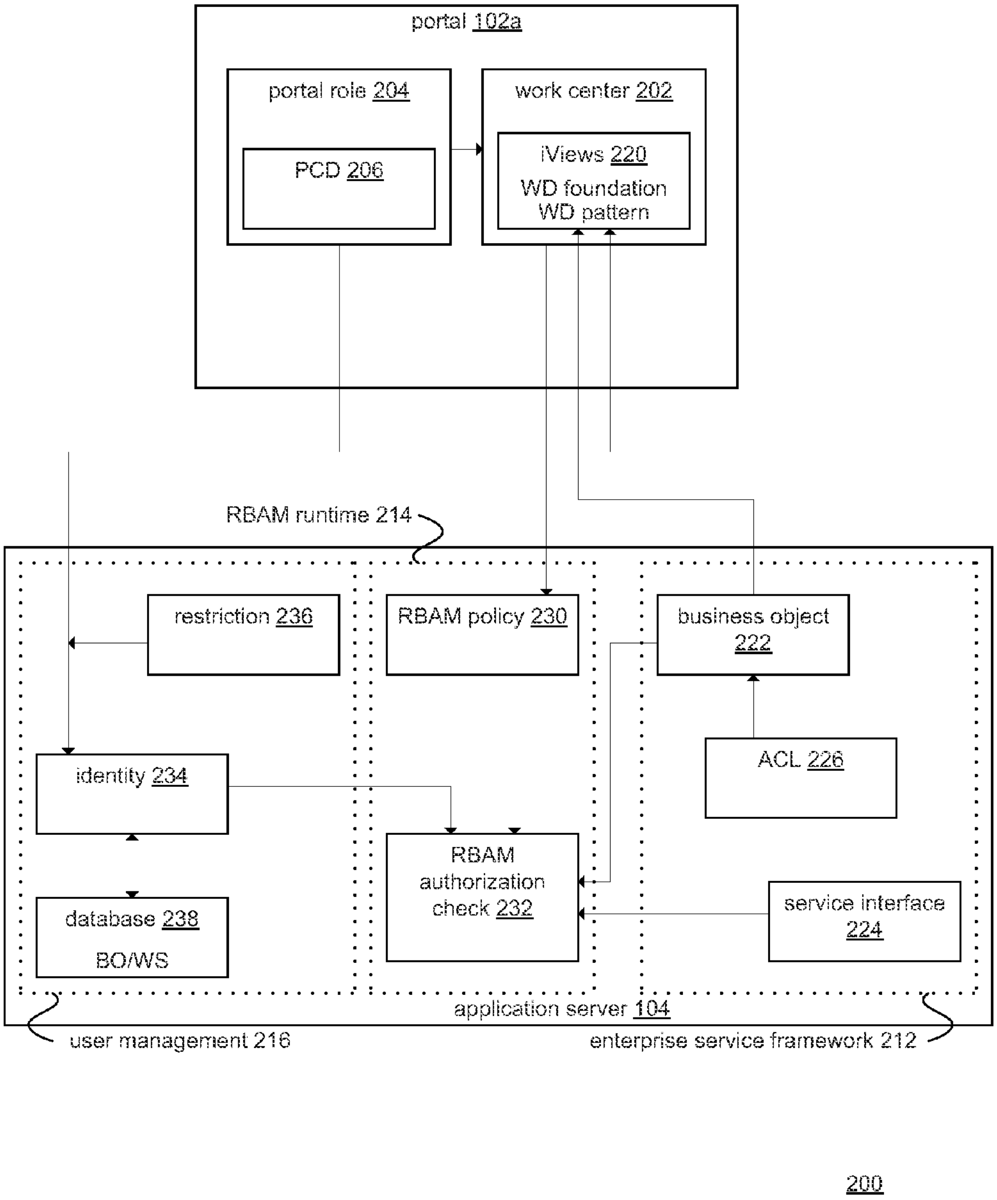
FIG. 2 is a block diagram of a system showing an exemplary portal and the application server with more detail for access control (compare to the system of FIG. 1), according to an embodiment.

FIG. 2 is a block diagram of a system 200 showing an exemplary portal 102*a* and the application server 104 with more detail for access control (compare to the system 100 of FIG. 1), according to an embodiment. The system 200 is shown in a "run-time" configuration for simplicity (e.g., the "design time" elements have been removed). The portal 102*a* includes a work center module 202, a portal role module 204, and a portal content directory (PCD) storage 206. The application server 104 (also referred to as an ABAP™ system in the SAP ByDesign™ environment) includes an enterprise service framework module 212, a RBAM runtime module 214, and a user management module 216.

Role-based access management (RBAM) is a NetWeaver technology provided with the SAP ByDesign system for implementing and managing authorizations. With this technology, authorizations for accessing business objects and their service interfaces are applied directly to the business objects. In addition, the business objects used by an application are maintained in the system, and therefore, a user's RBAM authorizations can be determined automatically based on the user's work center and role assignment in the portal. Further, access to Business Object instances can be restricted by defining Restrictions on the assignment between a user (represented as an Identity) and a Portal Role.

The work center module 202 includes an iViews module 220. iViews are self-contained web documents that are provided via a Uniform Resource Locator (URL) managed by the enterprise service framework module 212. The portal role module 204 interfaces between the work center module 202 and the user management module 216. The PCD storage 206 stores the portal content directory information that the portal role module 204 uses. The enterprise service framework module 212 includes a business object module 222, a service interface module 224, and an access control list (ACL) module 226. The ACL module 226 provides access control information to the business object module 222.

The RBAM runtime module 214 generally provides role based access management to the resources (e.g., business objects or web services) by the user. The RBAM runtime module 214 includes a RBAM policy module 230 and a RBAM authorization check module 232. The RBAM policy module 230 stores the RBAM policies. The RBAM authorization check module 232 checks whether a user request is permitted or not based on existing RBAM policies. In general, the role based access management may be implemented by policies and policy enforcement. RBAM represents authorizations as policies. They can be associated with a user interface, e.g. work center. An RBAM policy contains a set of rules for determining the RBAM authorizations that are associated with a work center. Rules specify conditions that refer to the user, the enterprise service and/or business object involved in a request. Rules can be defined for business objects and enterprise services directly, without redundant modeling of authorization objects. As an example, "Read access to all sales orders" is a textual description of a rule which allows invocation of the business object operation "READ" on any node of any business object whose type is "Sales Order".

The access enforcement takes place in the RBAM runtime module 214. The RBAM runtime module 214 is responsible for making authorization decisions. Authorization decisions are made both in Enterprise Portal (EP) and in backend systems providing the enterprise services and business objects for Portal UIs. In EP (UI layer), authorization checks are performed to ensure that users can only start iViews contained in their roles and work centers. ByDesign uses EP's existing mechanisms in the Portal Content Directory (PCD) 216 and User Management Engine (UME). They provide start permissions for portal roles and the iViews of their work sets, without any manual administration overhead. The Portal Runtime (PRT) automatically enforces these start permissions whenever users access the portal. In the backend (service & business logic layer), authorization checks are performed to ensure that only those enterprise services and business objects can be used which are required by a user's work center. RBAM supports instance based access control via so called restrictions. Restrictions allow an administrator to refine RBAM authorizations by specifying organizational criteria such as company, line organizational unit, or cost center. RBAM enforces restrictions using the following criteria:

- Access Context: An Access Context is an area of business activities with specific rules for access control such as Sales, Employee Self-Service, or Inventory.
- Access Group: An Access Group represents a group of persons responsible for a specific task. It may also refer to business regions such US, DE, JP, etc.
- Access Control List: An Access Control List specifies which Access Context and Access Group are allowed to access a Business Object instance it is attached to.

RBAM restrictions are assigned to existing user-role assignments. When a user attempts to access a Business Object RBAM runtime first determines if the user has permission to access it at all. This so called static check is based on the RBAM Policy that corresponds to the Portal Role to which the user has been assigned. If the user has permission RBAM then determines if restrictions may apply by matching the user's restrictions (note the restriction module 236) with the restrictions stored in the BO instances ACLs. Only instances that match to the user's Access Context and Access Group are accessible. This is sometimes referred to as the dynamic check.

The user management module 216 generally provides user management functionality for the application server 104. The user management functionality includes functions such as managing the identity of the user for the application server 104. The user management module 216 may be implemented with a user database. The user management module 216 includes an identity module 234, a restriction module 236, and a database module 238. The identity module 234 interfaces between the portal role module 204 and the RBAM authorization check module 232. The database module 238 stores the user data relating to the resources (e.g., BOs, WSs, etc.).

The application server 104 may implement the RBAM runtime module 214 or the user management module 216 as a general module that is shared by multiple applications, or as a dedicated module that is part of each application.

A policy includes one or more rules. When the (human) user requests access to the resource, the rule checks if the user (e.g., its identity, role, etc.) complies with defined conditions, and grants (allows) or denies access. For example, a user requests read access to the resource of a particular purchase order (PO); a first rule grants access to read this PO; but if the user requests to write data into that PO, a second rule denies that access. The term "access control" is related to the term "authorization", wherein both terms have a similar meaning.

Figure 3:
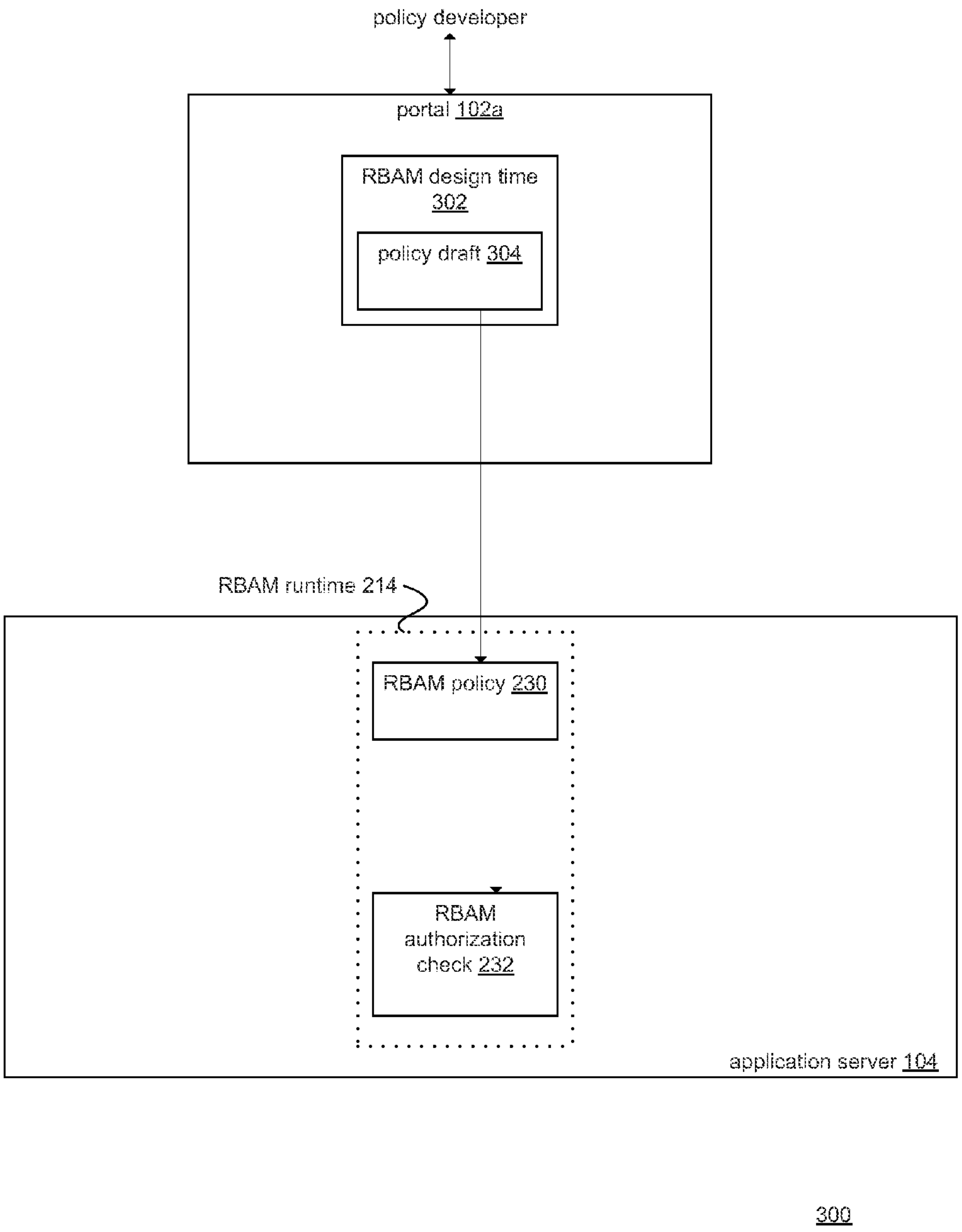
FIG. 3 is a block diagram of a computer system that includes the portal and the application server, showing policy updates according to an embodiment.

FIG. 3 is a block diagram of a computer system 300 that includes the portal 102*a* and the application server 104, showing policy updates according to an embodiment. The portal 102*a* includes a RBAM design time module 302 that stores a draft RBAM policy 304. The other components are similar to those in FIG. 2 and are not further described.

The RBAM design time module 302 updates the access control. The policy (i.e., the collection of rules) needs to be updated from time to time, for example, when business objects have been modified. In other words, the run-time-environment needs to be updated.

At the portal (102*a*) side, some of the (human) users are developers who are designing policy updates. For convenience, this user will be referred to as the "policy developer". Similar terms include tenant administrator and tenant developer. In business terms, these developers are non-SAP developers. Since—technically—the policies are located/stored on the server side (note the RBAM policy module 230), there are some mechanism available to: a) let the developers create/modify policy "drafts"; and b) move these "draft" policies to the server to update the policy. Note that the term "draft" is used to distinguish between the draft RBAM policy 304 (at the portal 102*a*) and the RBAM policy module 230 (at the application server 104).

The application is written in a primary language. To execute the application, the server has a run-time environment (RTE) for that primary language. For historic (and other reasons), the primary language for the application server 104 is a non-dynamic language (more specifically, the SAP-owned language ABAP™ according to an exemplary implementation). Writing non-dynamic (e.g., ABAP™) code requires special training.

In a first business approach, the application updates are prepared by a developer who writes code in the primary language. In case (i), there may be arrangements that let this developer upload the update from the portal 102*a* to the server 104. In case (ii), the developer bypasses the portal 102*a* and uploads to the server 104 directly. Case (i) is relevant for the above-mentioned on-demand environment: the developer may be working for a client developer (e.g., an SAP-customer or non-SAP developer), and such as case is encouraged by the application service provider (e.g., SAP), for reasons such as ecosystem development, community development, etc. In case (ii), the client developer may be associated with the application service provider (e.g., SAP), but this is not further discussed here.

The first business approach has the disadvantage of exposing client developers (e.g., outside the control of the application service provider [e.g., SAP]) to the primary language, and thereby requiring special training.

A second business approach seeks to let client developers (e.g., not employees of the application service provider) use a secondary language that requires only general training. The language Ruby is a candidate for this, because it is generally available, is not specific to a single application service provider, and is considered to be easy to learn.

The requirements for the second business approach are as follows. First, the existing RTE on the server for the primary language (e.g., the non-dynamic language, such as ABAP™) should not be changed. Second, the RTE should be able to "understand" the secondary language (e.g., the dynamic language, such as Ruby) completely. Third, special requirements regarding security (for example, to prevent malicious code [in any language] reaching the servers) should be met. Fourth, dialects of the secondary language that address specific needs to the application servers should be avoided.

In response to the requirements, according to an embodiment, source code in the secondary language may be translated into an intermediate language. Preferably, this is accomplished prior to executing (code/applications). In the context of this discussion, according to an exemplary implementation, SAP provides tools to translate Ruby source code into BRIL (Blue Ruby Intermediate Language; "Blue" being a non-relevant term that identifies an SAP-project). The tools are sometimes called "virtual machine VM". (The term VM should be differentiated from similar acronyms related to virtualization.) Further details regarding Blue Ruby can be found in U.S. Application Pub. No. 2009/0119642 for "System and Method of Executing a Dynamic Program in a Structured Environment" by Brendle et al.

Further in response to the requirements, according to an embodiment, security may be addressed by bridges and/or policies, for example. Details can be found in U.S. Application Pub. No. 2009/0119642 (describing "virtual machines" for two programs, one in a dynamic language, the other in a non-dynamic language, and the secured bridge(s) therebetween) and in U.S. application Ser. No. 12/167,915 for "Method and Apparatus for Improving Security in an Application Level Virtual Machine Environment" by Karabulut et al. (describing the operation of two programs, dynamic/non-dynamic in their respective environments, with an access permission policy therebetween).

Further in response to the requirements, according to an embodiment, language understanding may be addressed by enhancing the Ruby/BRIL translator.

Further in response to the requirements, according to an embodiment, since access control/user management on the servers belongs to this existing RTE, details on how these access control and user management functions may be reused are provided in subsequent paragraphs.

Figure 4:
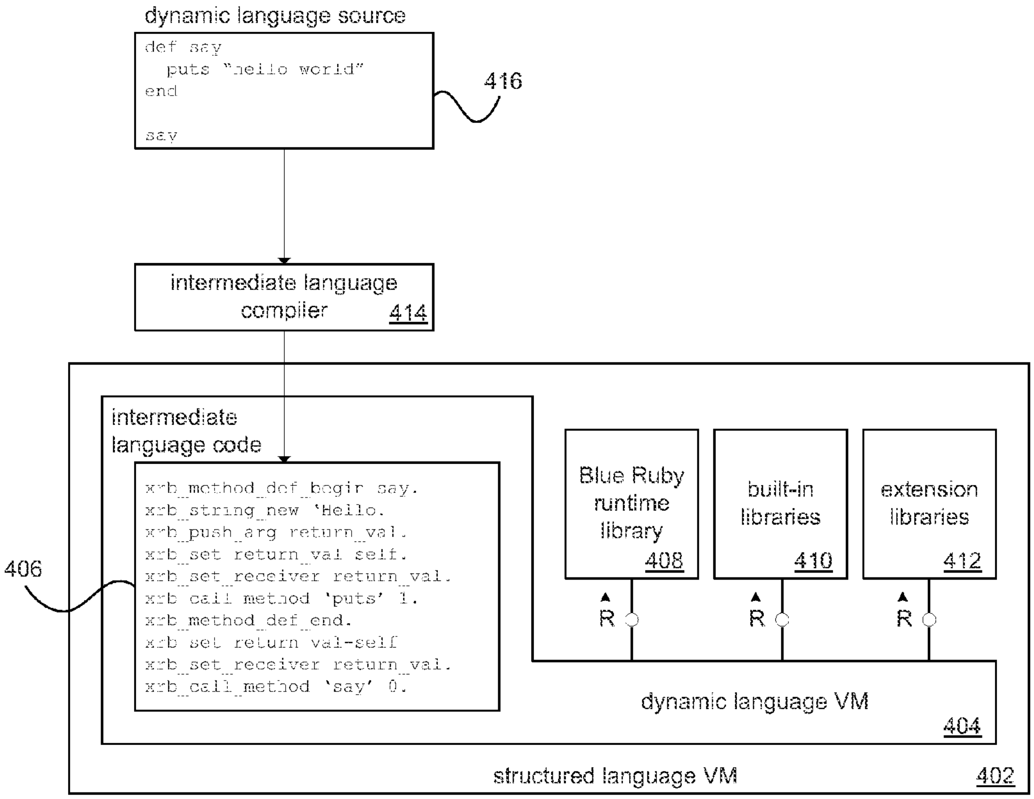
FIG. 4 is a block diagram showing a high level view of Blue Ruby according to an embodiment.

FIG. 4 is a block diagram showing a high level view of Blue Ruby according to an embodiment, including a structured language (e.g., ABAP™) virtual machine 402 (which may be implemented by an application server, e.g., SAP NetWeaver™ system), a dynamic language (e.g., Ruby) virtual machine 404, intermediate language code (e.g., Ruby intermediate language [BRIL] code) 406, a runtime library 408 (e.g., for Ruby), built-in libraries 410, extension libraries 412, an intermediate language (e.g., BRIL) compiler 414, and dynamic language (e.g., Ruby) source code 416. Further details regarding these components can be found in U.S. Application Pub. No. 2009/0119642 as discussed above.

More particularly regarding embodiments, the Blue Ruby virtual machine 404 handles program loading, method invocation, control and data flow. Everything is an object in Ruby; therefore the basic operations of the Blue Ruby virtual machine 404 are in creating objects and sending messages to them. For example, the notation in FIG. 4 of the "R" with the arrow indicates a request from one module to another module; a request/response pair is indicated by an "R" with two arrows between the modules (see, e.g., FIG. 6).

The runtime library 408 enables the Ruby type system and provides the basic structure and relationships between classes, modules, methods and object instances and their lifetime. The built-in libraries 410 are predefined operations on the base data types such as strings and numbers. The extension libraries 412 are further extensions that may be wholly or partially implemented in the structured (e.g., ABAP™) language. Secured bridge packages (not shown) allow access (by the Blue Ruby virtual machine 404) to the functionality of the underlying host platform (of the ABAP™ virtual machine 402) in a secure way by establishing a well defined sandbox concept.

The dynamic language code 416 is first compiled into an intermediate representation called the Blue Ruby Intermediate Language (BRIL) 406. BRIL-codes are to Ruby what Java™ bytecode is to the Java™ language. The BRIL codes are then loaded into the ABAP™ system using the normal ABAP™ load facility. By building certain extensions on top of the ABAP™ VM 402 (this is the Blue Ruby VM 404) those BRIL codes are then able to be executed in a similar fashion to how ABAP™ loads (the equivalent of bytecode for ABAP™) are normally executed by the ABAP™ VM 402.

Blue Ruby offers several bridges to the ABAP™ world—using these bridges, Ruby developers are able to both consume data managed by ABAP™ applications and also extend ABAP™ applications—Blue Ruby comes with a 2-way integration where Ruby can call certain ABAP™ APIs (e.g. Remote Function Calls [RFCs]) and ABAP™ can also call Ruby code.

Figure 5:
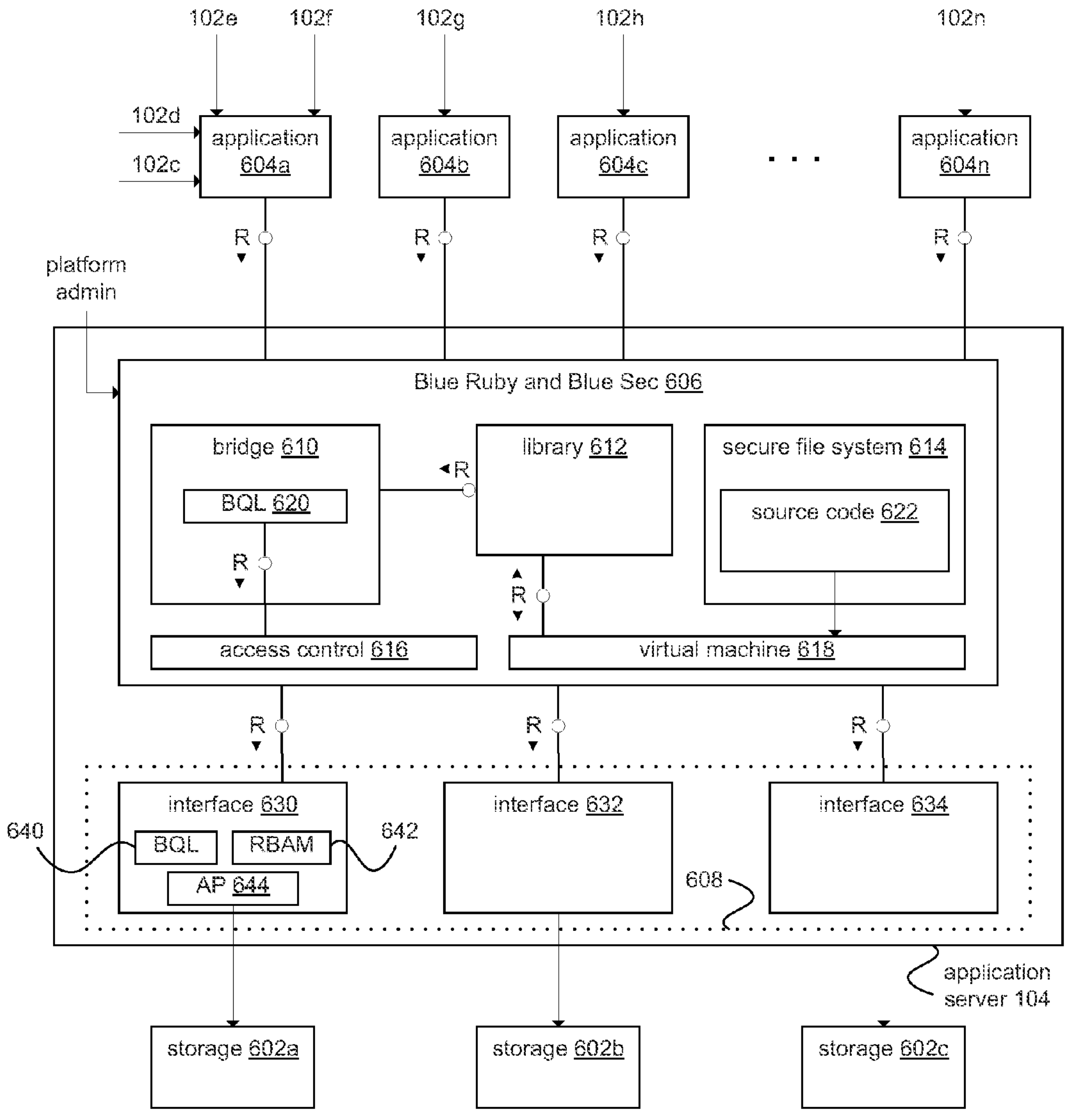
FIG. 5 is a simplified block diagram of the application server (see FIGS. 1-2), various portals, and a Ruby implementation according to an embodiment.

FIG. 5 is a simplified block diagram of the application server 104 (see FIGS. 1-2), various portals 102*c*, 102*d*, 102*e*, 102*f*, 102*g*, 102*h* and 102*n* (collectively portals 102), and a Ruby implementation according to an embodiment. The application server 104 interfaces with a number of resources (business object storage, web service storage, database storage, etc.) 602*a*, 602*b* and 602*c* (collectively resources 602). The application server 104 includes a number of applications 604*a*, 604*b*, 604*c* and 604*n* (collectively applications 604), a Blue Ruby and Blue Sec module 606, and a backend module 608.

The portals 102 provide various types of access to the applications 604. The portal 102*c* provides access to the application 604*a* for an application developer (e.g., a SAP developer or an independent software vendor [ISV] developer). The portal 102*d* provides access to the application 604*a* for a tenant administrator (e.g., client developer administrator). The portal 102*e* provides access to the application 604*a* for tenant developers (e.g., client developers). The portal 102*f* provides access to the application 604*a* for an end user. The portals 102*g*, 102*h* and 102*n* provide access to the applications 604*b*, 604*c* and 604*n*, respectively, for the end users. The applications 604 interface between the users (and developers, etc.) and the Blue Ruby and Blue Sec module 606. A platform administrator may manage the Blue Ruby and Blue Sec module 606.

The Blue Ruby and Blue Sec module 606 includes a bridge module 610, a library module 612, a secure file system module 614, an access control module 616, and a virtual machine module 618. The bridge module 610 in an exemplary embodiment implements an ABAP™ bridge between Blue Ruby libraries in the library module 612 and ABAP™ business objects (as mediated by the access control module 616). The bridge module 610 may include a BQL module 620 that generates appropriate queries to the access control module 616. The library module 612 stores code libraries (e.g., Blue Ruby code libraries in an exemplary embodiment). The secure file system module 614 stores the source code 622 of the dynamic language (e.g., Ruby programs). The access control module 616 provides queries from the Blue Ruby and Blue Sec module 606 to the backend module 608. The virtual machine module 618 implements a virtual machine, with sandboxing, for executing the dynamic programs (e.g., Ruby programs) as augmented by the library routines in the library module 612.

The backend module 608 interfaces between the application server 108 and the resources 602. The backend module 608 may include a number of specific interface modules based on the desired types of interfaces. A NetWeaver interface module 630 includes a BQL module 640, a RBAM module 642, and an application platform (AP) module 644. Other types of interfaces include an enterprise resource planning (ERP) interface module 632 and an other interface module 634.

Note that although FIG. 5 shows an exemplary implementation specific to Blue Ruby (Ruby within ABAP™), the principles illustrated may be used in other implementations for using a dynamic language in a structured language environment. More generally, the Blue Ruby and Blue Sec module 606 may be viewed as a specific implementation of a dynamic language based application design and runtime platform 606, the Netweaver interface module 630 may be viewed as a specific implementation of an interface module 630, etc.

Access Control in Combined Structured/Dynamic Environments

The Blue Ruby BQL Bridge 620 allows reading and updating the data contained in the Business Objects (BOs) offered by the AP module 644. In a productive environment that uses Blue Ruby to access BOs, it is desirable to have an authorization mechanism that provides regulated access to the BOs and their instances. According to an embodiment, the current authorization mechanism of the AP module 644, provided by the RBAM (Role Based Access Management) module 642, offers this functionality for SAP's ByDesign™ system. RBAM's authorization concept provides Business Object and instance-based access control when accessing Business Objects from the ByDesign Portal. The policy specification and user-role management components of RBAM are implemented in Java and Portal based solutions. Thus, RBAM's Java based functionality cannot be used for Blue Ruby, as its applications are coded in Ruby and run on the Blue Ruby VM 618. Thus, an embodiment is directed toward Blue Ruby offering an RBAM-like authorization solution to achieve Business Object Level Access Control (BOAC). More specifically, according to an embodiment, Blue Sec provides functionality needed for Authorization Designtime and Authorization Administration, while reusing RBAM Runtime (see FIG. 7). Thus, an embodiment is compatible with SAP's NetWeaver RBAM system.

An embodiment achieves BOAC via RBAM. This embodiment integrates Blue Ruby with SAP's NetWeaver RBAM system. This embodiment includes four distinct phases: Configuration, Authorization Designtime, Authorization Administration, and Authorization Runtime. The Authorization Designtime, Authorization Administration and Authorization Runtime phases are discussed in more detail in subsequent paragraphs.

RBAM Metamodel

The RBAM metamodel is separated into Enterprise Service Infrastructure (ESI), Role-Based Access Management (RBAM), Identity Management (IM), and End User Productivity (EUP). Basically, the ESI represents the resources that need protection: Business Objects and their operations on their data (Core Service) as well as Web Services (Service Interface). The IM contains the users (Identity) who potentially access the protected resources. The entities in the model's RBAM part describe the role-based access control. With these entities one can express if and to what extent a user can access the protected resources. Finally, the EUP describes the user interface to the protected resources on an abstract level. A user's access privileges depend on his or her Role and the Work Center. The Work Center concept is a specialty of the ByDesign Portal. A Work Center consists of several websites, so called iViews, through which a user works with the protected resources.

A notable concept in a role-based access control implementation is the Role. In RBAM a Role is described by a Policy. A Policy defines the access privileges to the protected resources. It consists of several Rules which are either GRANT or DENY access. Each Rule then has several Conditions which describe the actual access control in the classical way of Subject, Operation and Resource. These entities together with the additional Environment entity are so called Attributes. A Subject corresponds to users who are represented by the entity Identity in the Identity Management. All operations which are available on the Business Objects and Web Services are summarized by the entity Operation. And finally, the Resource entity describes the protected resources: the Business Objects and the Web Services. A user then gets access to the protected resources through his or her Role-Assignment.

With the information contained in the aforementioned entities, RBAM Runtime (see FIG. 7) is able to perform a static check. In order for the RBAM Runtime to perform a dynamic check, additional information is necessary (e.g. to provide instance-based access control).

Instance-based access control focuses on the entity Restriction. A Restriction is expressed by an Access Context, an Access Group, and a Work Center and is assigned to a user's role association. In this way, a User acting in a Role has only access to Business Object instances which belong to the same Access Context and Access Group as specified in the Restriction for this User-Role Assignment. An RBAM Policy for a Role that should be usable for instance-based access control should have Conditions expressed with Filters.

An Access Group cannot exist without an Access Context. For that reason, an Access Control Entry node in the Access Control List BO stores both attributes. Therefore, every BO for which instance-based access control should be used has an association with Access Control List BO.

In a portal/server combination (which is convenient in on-demand environments), the server provides a run-time environment (RTE) in a primary (structured) language (e.g., ABAP). The RTE includes access control; the portal sends access requests to resources (like business objects or webservices). Actions are distinguished in different phases: a) Authorization Design Time (ADT); b) Authorization Administration Time (AAT); and c) Authorization Run Time (ART).

Figure 6:
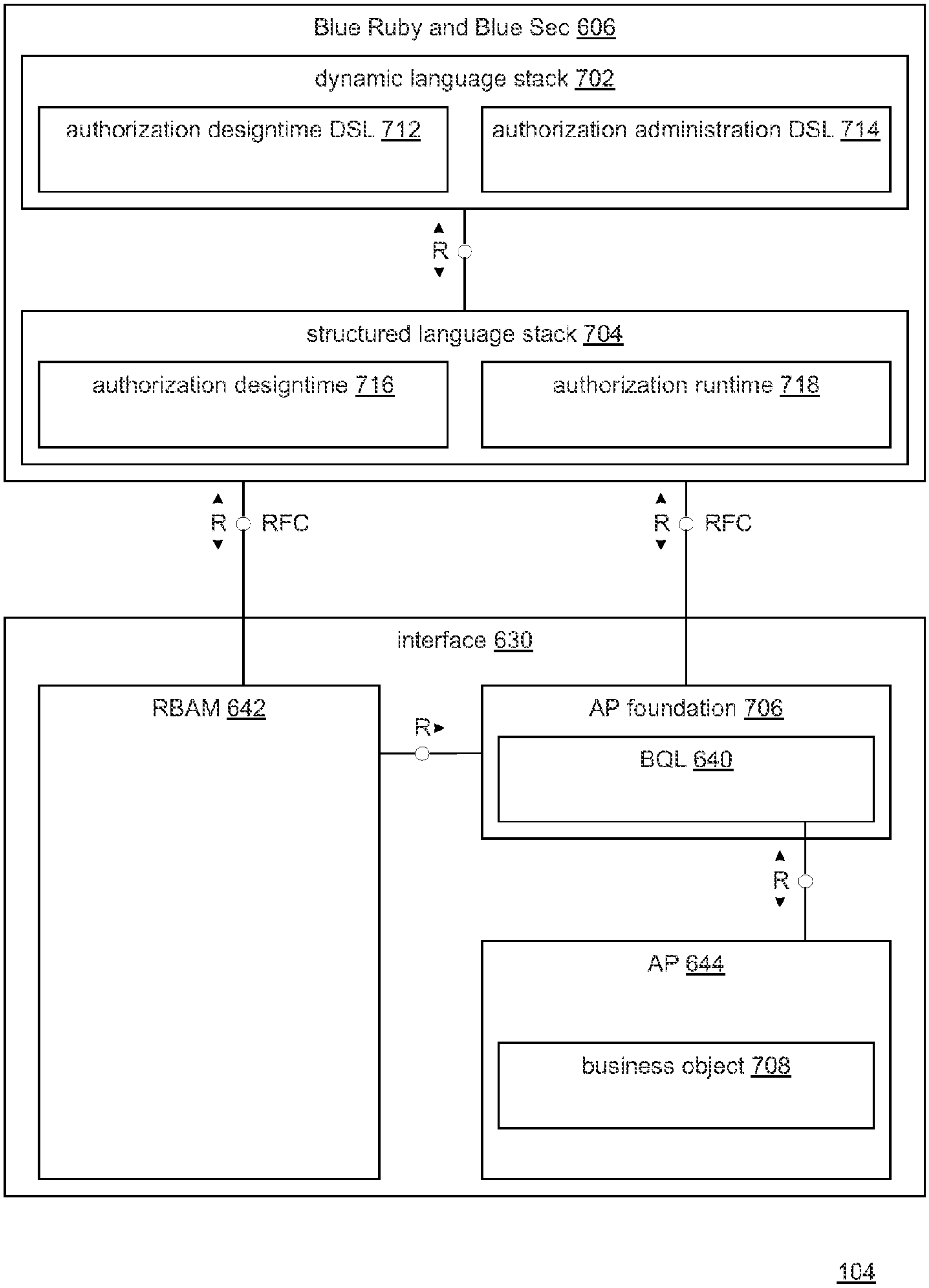
FIG. 6 is a simplified block diagram of an implementation for the secondary language (e.g., Ruby) at the application server, according to an embodiment.

FIG. 6 is a simplified block diagram of an implementation for the secondary language (e.g., Ruby) at the application server 104 (i.e. the server with the extensions), according to an embodiment. Note that some elements are similar to those in FIG. 5, such as the Blue Ruby and Blue Sec module 606, the NetWeaver interface module 630, the BQL module 640, the RBAM module 642, and the AP module 644. The application server 104 further includes a dynamic language (e.g., Ruby) stack 702, a structured language (e.g., ABAP™) stack 704, an AP foundation module 706 that includes the BQL engine 640, and a business object module 708 in the AP module 644.

The dynamic language stack 702 generally implements and manages a stack for the dynamic language (e.g., Ruby) environment. The dynamic language stack 702 includes an authorization designtime domain specific language (DSL) module 712 and an authorization administration DSL module 714. In an exemplary embodiment, the dynamic language stack 702 implements a Blue Ruby stack, the authorization designtime DSL module 712 implements a Blue Sec authorization designtime DSL module, and the authorization administration DSL module 714 implements a Blue Sec authorization administration DSL module.

The structured language stack 704 generally implements and manages a stack for the structured language (e.g., ABAP™) environment. The structured language stack 704 includes an authorization designtime module 716 and an authorization runtime module 718. In an exemplary embodiment, the structured language stack 704 implements an ABAP™ stack, the authorization designtime module 716 implements a Blue Sec authorization designtime module, and the authorization runtime module 718 implements a Blue Sec authorization runtime module.

More specifically, in an exemplary implementation, Blue Ruby runs on top of a NetWeaver™ stack. Blue Ruby accesses the NetWeaver™ backend and its components using remote function calls (RFCs).

Figure 7:
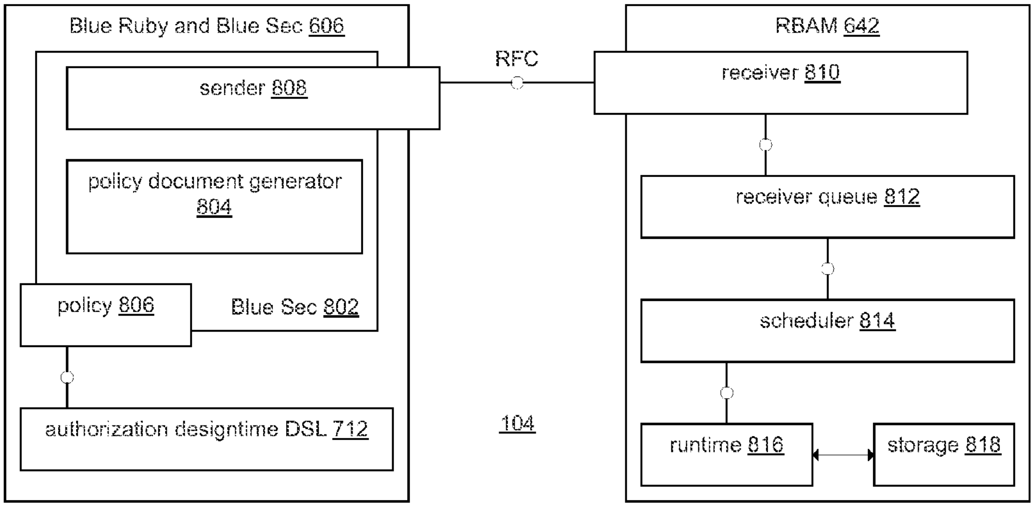
FIG. 7 is a simplified block diagram of the application server showing details of a policy update procedure at ADT, according to an embodiment.
Figure 8:
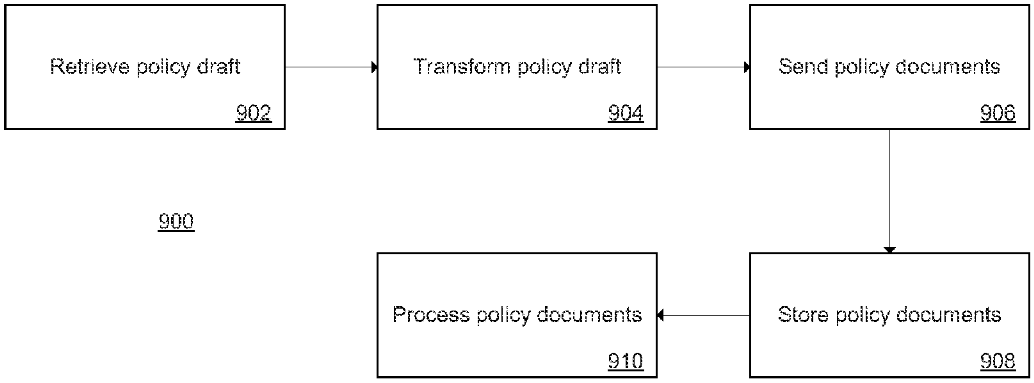
FIG. 8 is a flow diagram of a policy load process according to an embodiment.

Three phases are distinguished: Authorization Design Time (ADT), Authorization Administration Time (AAT) and Authorization Runtime (ART). FIGS. 7-9 relate to ADT, FIGS. 10-11 relate to AAT, and FIG. 12 relates to ART.

Authorization Design Time (ADT)

FIG. 7 is a simplified block diagram of the application server 104 showing details of a policy update procedure at ADT, according to an embodiment. The Blue Ruby and Blue Sec module 606, the RBAM module 642, and the authorization designtime DSL module 712 can be seen in FIG. 6. The Blue Ruby and Blue Sec module 606 further includes a Blue Sec ABAP™ module 802 (also shown in FIG. 6 as the structured language stack 704), a policy document generator module 804, a policy storage module 806, and a sender module 808.

The policy storage module 806 stores policies. The policies are written in the secondary (dynamic) language (e.g., Ruby). The user accesses the policies via the authorization designtime DSL module 712. The user that is active here is the abovementioned policy developer (cf. FIG. 3). According to an embodiment, the developer can program the policy in the secondary language (e.g., Ruby). The language may be enhanced by a domain specific language (DSL) for policy making (e.g., stored as a policy draft, not yet the completed policy).

The policy document generator module 804 generates a policy document from the policy draft. The policy document serves to format the policy draft in a desired format for the RBAM module 642. According to an embodiment, the RBAM module 642 accepts documents in extensible markup language (XML) format, so the policy document generator module 804 generates the policy document in XML format from the policy draft.

The sender module 808 interfaces the Blue Ruby and Blue Sec module 606 and the RBAM module 642. More specifically, the sender module 808 sends the policy document from the Blue Ruby and Blue Sec module 606 to the RBAM module 642. The sender module 808 may communicate with the RBAM module 642 via a remote function call (RFC).

The RBAM module 642 further includes a receiver module 810, receiver queue module 812, a scheduler module 814, a runtime module 816, and a storage module 818. The receiver module 810 interfaces with the sender module 808 to receive the policy document. The receiver queue module 812 stores one or more policy documents. The scheduler module 814 schedules the transfer of policy documents from the receiver queue module 812 to the runtime module 816. The runtime module 816 implements a runtime environment that includes the appropriate policy document. The storage module 818 stores information used by the runtime module 816.

More specifically, FIG. 7 shows a more detailed view on the components of the Blue Sec Authorization Designtime (ADT). The Authorization Designtime in the Blue Ruby provides a Developer with a policy specification DSL to specify RBAM compliant policies. These policies are then stored in Blue Sec's ABAP tables (e.g., as policy drafts in the policy storage module 806).

At some later point the Developer desires to push the draft policies to the RBAM module 642. According to an embodiment, this is achieved by triggering an RBAM Initial Load. Before an Initial Load can be sent to the RBAM module 642 the steps of FIG. 8 take place.

FIG. 8 is a flow diagram of a policy load process 900 according to an embodiment. The process 900 may be implemented by the application server 104 using the modules shown in FIG. 7. The application server 104 may perform the process 900 as instructed by one or more computer programs.

At 902, the policy data (e.g., the policy draft) is retrieved from the ABAP tables (e.g., the policy storage module 806) and passed to a Simple Transformation (e.g., the policy document generator module 804).

At 904, the policy document generator module 804 transforms the policy draft. This transformation encapsulates the policy data (e.g., the policy draft) into the policy document (e.g., a RBAM compliant policy XML document). These policy XML documents are the payload of the Initial Load.

At 906, the sender module 808 sends the policy documents over a RFC connection to the receiver module 810.

At 908, the receiver module accepts the Initial Load and stores the policy XML documents in the receiver queue module 812, for example in a queue (referred to as the receiver queue).

At 910, the receiver queue is processed by the scheduler module 814 in regular intervals. During this process, the policy data gets transformed back from XML to data tables (e.g., ABAP tables) that are used by the runtime module 816. These data tables may be stored in the storage module 818. At this point, the runtime module 816 is aware of the policies (see ART below).

Authorization Designtime DSL

According to an embodiment, the Authorization Designtime provides a Developer with a DSL in the dynamic language (e.g., a Ruby DSL) to specify RBAM Policies. FIGS. 9A-9B illustrate the Authorization Designtime DSL.

FIG. 9A shows a simplified view of a RBAM Policy DSL according to an embodiment. Several RBAM Policies can be contained in one policy set. Each RBAM Policy has a name <policy name> and can have multiple grant or deny rules. Each rule can have several conditions where each rule should have a condition for the subject, the operation and the object. This is expressed with a <subject condition>, a <operation condition>, and a <resource condition>. The object in the RBAM context is the Business Object. The <instance-based access control condition> is used when access control should have the granularity of Business Object instances.

FIG. 9B shows an example RBAM Policy specified in the DSL structure shown in FIG. 9A, according to an embodiment. The RBAM Policy as shown in FIG. 9B states that users (:SUBJ) who are assigned to the role:ZTST_CUSTOMER_ROLE and work in the :BLUERUBY_WORKCENTER and Access Context:RBAMTEST_Sales_Organisation are allowed (grant) to access any node (IS_CHILD_OF) of the resource:RBAMTEST_Customer (a Business Object). (The concept of "workcenter" in the context of Blue Ruby is irrelevant. We include this statement as it is required by a specific implementation of the RBAM policy structure. According to another embodiment, this field may be added to the RBAM policies by Blue Sec's RBAM policy generator (see the policy document generator module 804 in FIG. 7).

Authorization Administration Time (AAT)

Figure 10:
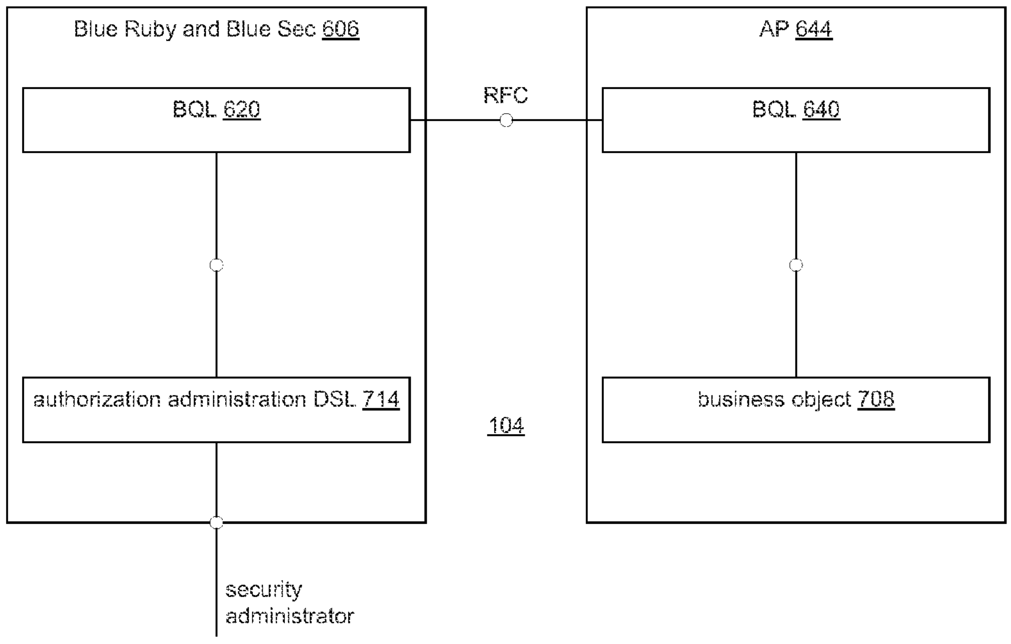
FIG. 10 is a block diagram showing the modules of the application server involved at Authorization Administration Time (AAT), according to an embodiment.

FIG. 10 is a block diagram showing the modules of the application server 104 involved at Authorization Administration Time (AAT), according to an embodiment. (Compare to FIG. 7, which shows Authorization Design Time [ADT]). The elements of FIG. 10 can be seen in previous FIGS. 5-6.

Similar to the Authorization Designtime (see FIG. 7), a Security Administrator uses a Ruby DSL (e.g., using the Blue Sec Authorization Administration DSL module 714) for the Authorization Administration. The administrator uses the DSL to assign a user to roles as well as adding Restrictions to these assignments. Using BQL (e.g., stored in the BQL Ruby library module 620), this information (referred to as user-role assignment information) is then stored directly in the Business Object Identity instance of a user (e.g., the Blue Ruby and Blue Sec module 606 communicates this information via RFC to the BQL Engine module 640; the business object identity module 708 then stores the information). Later, this information is used by the RBAM runtime module 816 (see FIG. 7).

The DSL (e.g., implemented by the Blue Sec authorization administration DSL module 714) is provided as a Blue Ruby library (e.g., implemented by the Blue Ruby library module 612 in FIG. 5), which makes use of the BQL Ruby library module 620 to send BQL queries and updates over an RFC connection to the BQL engine module 640.

Authorization Administration DSL

In order to make user-role assignments and user-role assignments restrictions, an embodiment includes a User-Role Assignment DSL. The following description gives a simplified view on the structure of a user-role assignment as it may be written with the User-Role Assignment DSL.

FIG. 11A shows a simplified view of the User-Role Assignment DSL, according to an embodiment. Several user-role assignments may be contained in one role assignments. A user <user name> is assigned a role <role name> with the keyword assign. If additionally this user-role assignment should have restrictions (because, for example, BO instance-based access control granularity is desired), then this may be specified in the <user-role assignment restrictions> part.

FIG. 11B shows an example of a user-role assignment and user-role assignment restriction in the DSL of FIG. 11A, according to an embodiment. The example shown in FIG. 11B assigns the role:ZTST_CUSTOMER_ROLE to the three users:KARABULUTY, :TESTGREENE and:TESTDOUGLAS. Each of these users belongs to the workcenter :BLUERUBY_WORKCENTER and performs business activities in :RBAMTEST_Sales_Organisation (access context). The user:KARABULUTY is allowed to access any BO instances within SAP (:SAP and:subordinated) whereas: TESTGREENE and :TESTDOUGLAS are only allowed to access BO instances in Germany (:SAP_DE) and the United States (:SAP_US), respectively.

Authorization Runtime (ART)

Figure 12:
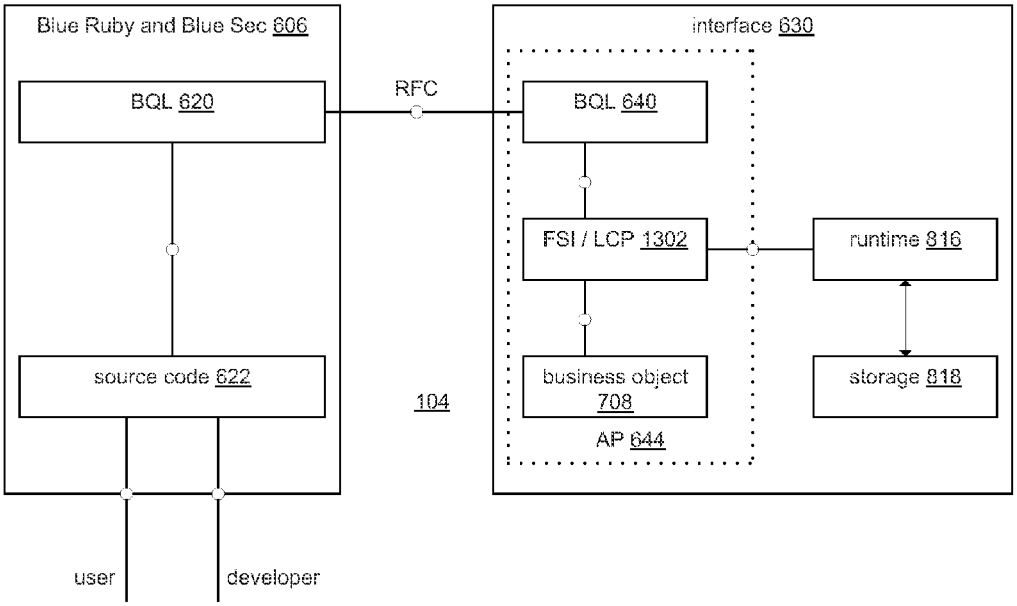
FIG. 12 is a block diagram showing the modules of the application server involved at Authorization Runtime (ART), according to an embodiment.

FIG. 12 is a block diagram showing the modules of the application server 104 involved at Authorization Runtime (ART), according to an embodiment. (Compare to FIG. 7, which shows ADT, and FIG. 10, which shows AAT.) The elements of FIG. 12 can be seen in previous FIGS. 5-7, plus a FSI/LCP (fast search infrastructure/local client proxy) module 1302. The FSI/LCP module 1302 interfaces between the BQL engine module 640, the business object module 708, and the RBAM runtime module 816.

An example usage of the embodiment of FIG. 12 is as follows. A developer writes a dynamic (e.g., Ruby) program that accesses information in the structured environment (e.g., Business Objects via a BQL query). At some later point, a user executes this program. During the program's execution, the query is sent from the dynamic environment to the structured environment (e.g., to the BQL engine module 640 in the backend by an RFC connection). The query is then restricted by the combination of BQL and RBAM as described above. In this way, the user who executes a BQL query can only access business data for which he or she has authorization.

In summary, the following text explains the actions (at the computer system) when the developer has finalized the policy and makes it available to the RBAM of the application server. First, the draft policy is pushed to the RBAM. Second, an initial load is performed. Third, the draft policy is retrieved from the ABAP tables and passed to a simple transformation. (The draft policy may be developed by an application developer or an application administrator as appropriate.) Fourth, the policy draft is converted to an XML draft that is understood by the RBAM. Fifth, the RBAM receives the XML draft and performs storing/scheduling. Sixth, at the next appropriate time, the RBAM incorporates the XML draft as a policy in the runtime.

Figure 13:
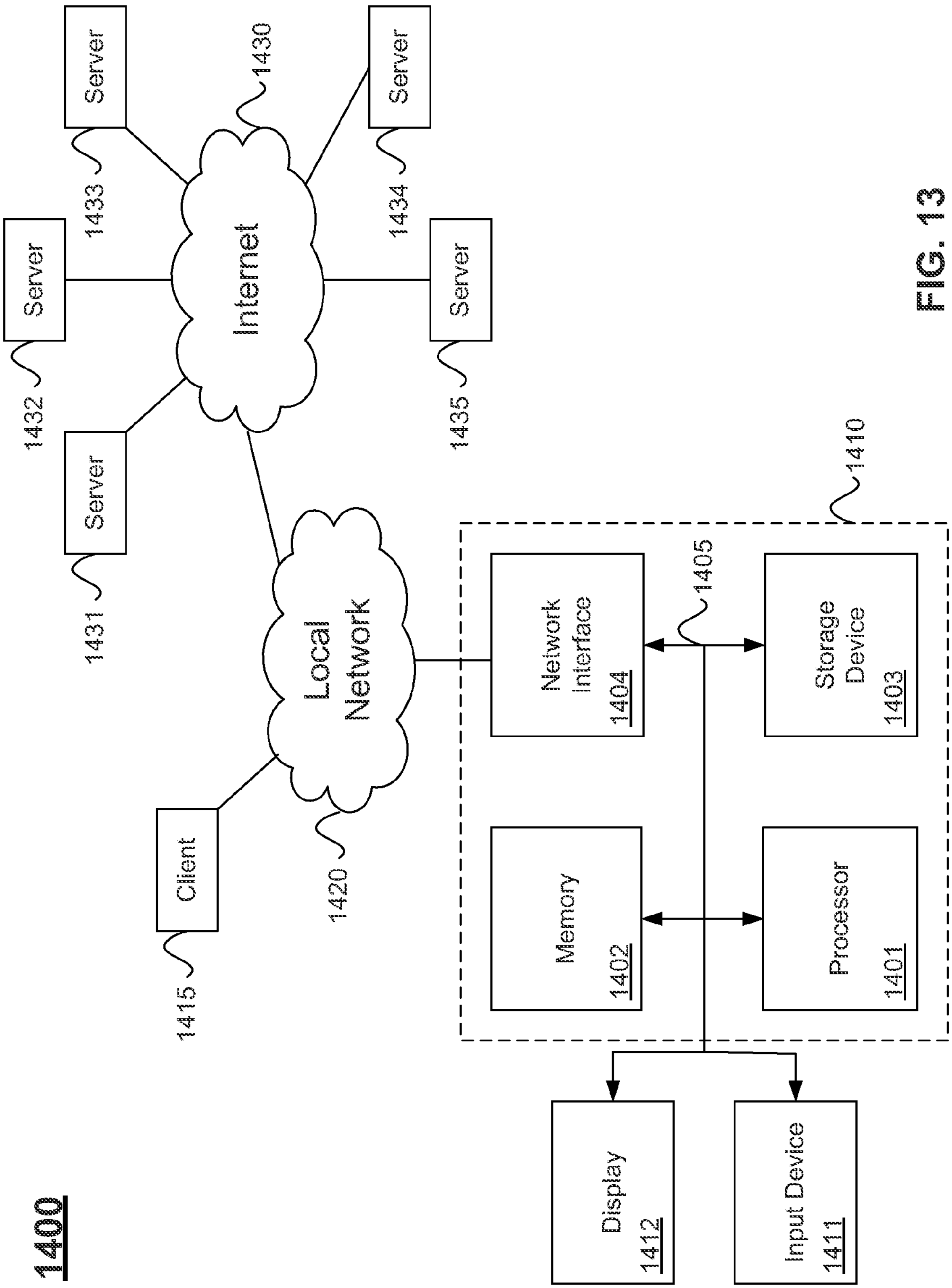
FIG. 13 is a block diagram of an example computer system and network for implementing embodiments.

FIG. 13 is a block diagram of an example computer system and network 1400 for implementing embodiments. Computer system 1410 includes a bus 1405 or other communication mechanism for communicating information, and a processor 1401 coupled with bus 1405 for processing information. Computer system 1410 also includes a memory 1402 coupled to bus 1405 for storing information and instructions to be executed by processor 1401, including information and instructions for performing the techniques described above. This memory may also be used for storing temporary variables or other intermediate information during execution of instructions to be executed by processor 1401. Possible implementations of this memory may be, but are not limited to, random access memory (RAM), read only memory (ROM), or both. A storage device 1403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1403 may include source code, binary code, or software files for performing the techniques or embodying the constructs above, for example.

Computer system 1410 may be coupled via bus 1405 to a display 1412, such as a cathode ray tube (CRT) or liquid crystal display (LCD), for displaying information to a computer user. An input device 1411 such as a keyboard and/or mouse is coupled to bus 1405 for communicating information and command selections from the user to processor 1401. The combination of these components allows the user to communicate with the system. In some systems, bus 1405 may be divided into multiple specialized buses.

Computer system 1410 also includes a network interface 1404 coupled with bus 1405. Network interface 1404 may provide two-way data communication between computer system 1410 and the local network 1420. The network interface 1404 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1404 sends and receives electrical, electromagnetic, or optical signals that carry digital data streams representing various types of information.

Computer system 1410 can send and receive information, including messages or other interface actions, through the network interface 1404 to an Intranet or the Internet 1430. In the Internet example, software components or services may reside on multiple different computer systems 1410 or servers 1431, 1432, 1433, 1434 and 1435 across the network. A server 1431 may transmit actions or messages from one component, through Internet 1430, local network 1420, and network interface 1404 to a component on computer system 1410.

The computer system and network 1400 may be configured in a client server manner. The client 1415 may include components similar to those of the computer system 1410.

More specifically, the computer system 1410 may implement one or more of the modules of the application server 104 (see FIG. 2), e.g., the enterprise service framework module 212. The computer system 1410 may execute one or more computer programs to perform the functions of a module implemented by the application server 104 (see FIG. 2). The client 1415 may implement one or more modules of the portal 102*a* (see FIG. 2).

The above description illustrates various embodiments along with examples of how aspects may be implemented. The above examples and embodiments should not be deemed to be the only embodiments, and are presented to illustrate the flexibility and advantages as defined by the following claims. Based on the above disclosure and the following claims, other arrangements, embodiments, implementations and equivalents will be evident to those skilled in the art and may be employed without departing from the spirit and scope as defined by the claims.

What is claimed is:

1. A computer-implemented method of managing access control policies on a computer system having two high-level programming language environments, comprising:

managing, by the computer system, a structured language environment;

managing, by the computer system, a dynamic language environment within the structured language environment;

receiving a policy, wherein the policy is written in a dynamic language;

storing the policy in the dynamic language environment;

converting the policy from the dynamic language environment to the structured language environment; and generating a runtime in the structured language environment that includes the policy.

2. The computer-implemented method of claim 1, further comprising:

permitting access, according to the policy in the runtime having been generated, to a data object managed by the structured language environment, by a user operating in the dynamic language environment.

3. The computer-implemented method of claim 1, further comprising:

denying access, according to the policy in the runtime having been generated, to a data object managed by the structured language environment, by a user operating in the dynamic language environment.

4. The computer-implemented method of claim 1, further comprising:

storing the policy as a data structure managed in the structured language environment.

5. The computer-implemented method of claim 1, wherein the policy sets access permissions for a user.

6. The computer-implemented method of claim 1, wherein converting the policy from the dynamic language environment to the structured language environment comprises:

generating an extensible markup language document that corresponds to the policy;

sending the extensible markup language document from the dynamic language environment to the structured language environment;

queuing the extensible markup language document; and processing the extensible markup language document at a defined interval.

7. The computer-implemented method of claim 1, further comprising:

receiving user-role assignment information, wherein the user-role assignment information is written in the dynamic language;

converting the user-role assignment information from the dynamic language environment to the structured language environment; and storing the user-role assignment information as a data object in the structured language environment.

8. A computer system that manages access control policies using two high-level programming language environments, comprising:

a structured language environment module that is configured to manage a structured language environment;

a dynamic language environment module that is configured to manage a dynamic language environment within the structured language environment;

a portal module that is configured to receive a policy, wherein the policy is written in a dynamic language;

a storage module that is configured to store the policy in the dynamic language environment;

a conversion module that is configured to convert the policy from the dynamic language environment to the structured language environment; and a runtime module that is configured to generate a runtime in the structured language environment that includes the policy.

9. The computer system of claim 8, further comprising:

an access control module that is configured to permit access, according to the policy in the runtime having been generated, to a data object managed by the structured language environment, by a user operating in the dynamic language environment.

10. The computer system of claim 8, further comprising:

an access control module that is configured to deny access, according to the policy in the runtime having been generated, to a data object managed by the structured language environment, by a user operating in the dynamic language environment.

11. The computer system of claim 8, wherein the storage module is further configured to store the policy as a data structure managed in the structured language environment.

12. The computer system of claim 8, wherein the policy sets access permissions for a user.

13. The computer system of claim 8, wherein the conversion module is further configured:

to generate an extensible markup language document that corresponds to the policy;

to send the extensible markup language document from the dynamic language environment to the structured language environment;

to queue the extensible markup language document; and to process the extensible markup language document at a defined interval.

14. The computer system of claim 8, further comprising:

a receiver module that is configured to receive user-role assignment information, wherein the user-role assignment information is written in the dynamic language, wherein the conversion module is further configured to convert the user-role assignment information from the dynamic language environment to the structured language environment, and wherein the storage module is further configured to store the user-role assignment information as a data object in the structured language environment.

15. A computer program, embodied on a tangible non-transitory recording medium, that is configured to control a computer system to manage access control policies using two high-level programming language environments, comprising:

a structured language environment module that is configured to control the computer system to manage a structured language environment;

a dynamic language environment module that is configured to control the computer system to manage a dynamic language environment within the structured language environment;

a portal module that is configured to control the computer system to receive a policy, wherein the policy is written in a dynamic language;

a storage module that is configured to control the computer system to store the policy in the dynamic language environment;

a conversion module that is configured to control the computer system to convert the policy from the dynamic language environment to the structured language environment; and a runtime module that is configured to control the computer system to generate a runtime in the structured language environment that includes the policy.

16. The computer program of claim 15, further comprising:

an access control module that is configured to control the computer system to permit access, according to the policy in the runtime having been generated, to a data object managed by the structured language environment, by a user operating in the dynamic language environment.

17. The computer program of claim 15, further comprising:

an access control module that is configured to control the computer system to deny access, according to the policy in the runtime having been generated, to a data object managed by the structured language environment, by a user operating in the dynamic language environment.

18. The computer program of claim 15, wherein the storage module is further configured to control the computer system to store the policy as a data structure managed in the structured language environment.

19. The computer program of claim 15, wherein the conversion module is further configured to control the computer system:

to generate an extensible markup language document that corresponds to the policy;

to send the extensible markup language document from the dynamic language environment to the structured language environment;

to queue the extensible markup language document; and to process the extensible markup language document at a defined interval.

20. The computer program of claim 15, further comprising:

a receiver module that is configured to control the computer system to receive user-role assignment information, wherein the user-role assignment information is written in the dynamic language, wherein the conversion module is further configured to control the computer system to convert the user-role assignment information from the dynamic language environment to the structured language environment, and wherein the storage module is further configured to control the computer system to store the user-role assignment information as a data object in the structured language environment.

* * * * *